July 11, 1967

C. F. DONNELLY 3,330,228

PLASTIC PALLET SUPPORTING UNIT

Filed July 1, 1966

INVENTOR.
CLEMENT F. DONNELLY

BY *Salter + Michaelson*

ATTORNEYS

United States Patent Office 3,330,228
Patented July 11, 1967

3,330,228
PLASTIC PALLET SUPPORTING UNIT
Clement F. Donnelly, 611 Commonwealth Ave.,
Warwick, R.I. 02886
Filed July 1, 1966, Ser. No. 565,039
11 Claims. (Cl. 108—51)

This is a continuation-in-part of application Ser. No. 414,806, filed Nov. 30, 1964, now abandoned, and entitled "Plastic Pallet and Method of Making Same."

The present invention relates to a plastic pallet and to the method of manufacture thereof. More particularly, the present invention relates to a pallet that is formed entirely of plastic materials and that is constructed by a unique method that provides for the securement of the pallet elements in such a manner as to produce a high impact pallet that is resisitant to moisture, temperature and wear.

The pallet embodied in the present invention has application and use with the conventional fork lift truck or wherever pallets have been employed heretofore. The prior known pallet constructions have normally been fabricated of wood materials, and although wood is economical and is easily worked to produce a pallet, pallets formed of wood have certain inherent defects that have rendered them undesirable in use. Firstly, wood is relatively fragile; and thus pallets constructed of this material are limited in the life thereof, particularly when subjected to wear and abuse normally experienced with fork lift trucks. Furthermore, wood is also relatively heavy, and the weight of a wood pallet will be materially increased when subjected to moisture.

Other kinds of materials have been suggested for use in pallet constructions, such as the light-weight metals and compositions, such as fibrous materials. These prior known materials that have been substituted for wood in the fabrication of pallets have found some favor in the trade but are normally too expensive to employ. However, pallets that have been formed of materials other than wood have not lived up to expectations from the point of view of wear requirements.

The present invention represents a radical departure in pallet constructions from those known heretofore, and is fabricated by a unique process entirely of plastic materials. Prior to carrying out the assembly of the load carrying pallet embodied in the present invention, certain basic molds are first constructed that are employed in the fabrication of the various elements that are joined together to define the complete pallet assembly. With the basic molds having been previously constructed, the method of fabricating the load carrying pallet of the present invention is accomplished by first forming a bottom shell that includes a plurality of hollow, spaced, parallel members that define the stringers for the pallet between which the fork of a lift truck are inserted. The shell is constructed by applying a plurality of layers of resinous material in the mold for the shell and building up the layers of resinous materials to a required skin thickness. Each alternate layer of the resinous material that is applied in the mold is preferably impregnated with a reinforcing material such as fiberglass, so that the bottom shell is formed with a skin of predetermined thickness and is fairly rigid in the formation thereof. After removing the bottom shell from its mold, an expanding resinous foam, such as expandable urethane foam, is then poured into the shell and into the cavities or hollow members therein, and immediately thereafter a pre-formed top member that may be formed of a plurality of layers of resinous material is clamped onto this shell, thereby capturing the expanding foam material within the shell. Because of the nature of the foam material and the characteristics of the resinous material from which the top member is formed, the foam material inherently adheres to the inner surfaces of the top member to cause the top member to unite with the bottom shell as a unitary construction. The top member thus cooperates with the bottom shell to form a platform that defines the top of the pallet. The constructional formation of the pallet may be completed by inserting a plurality of supporting or spreader members into notches that have been preformed in the stringers. The supporting members are preferably preformed of layers of resinous material and naturally adhere to the stringers during the assembly operation. If required, the process is completed by spraying the entire outer surfaces of the bottom shell, the top member and the supporting members with a resinous material. After a predetermined curing time, the resinous material, which is quick setting, soon hardens, and the plastic pallet is complete and ready for use.

The pallet, which is rigid in construction, has an unusually high resistance to impact, shock and compression, is practically non-absorbent to liquids and will withstand temperatures that vary from —40° to 300° F. The pallet is also light in weight and, as constructed in accordance with the present invention, weighs approximately ten pounds.

It is therefore an object of the present invention to provide a load carrying pallet construction that is light in weight, resistant to impact, resistant to changes in temperature and is economical to manufacture.

Another object of the invention is to teach a unique method of constructing a load carrying pallet, the essential elements of which are formed entirely of plastic materials.

Still another object is to teach a method of constructing a load carrying pallet, wherein the essential elements of the pallet are cast and then assembled in a prescribed manner.

Still another object is to provide a plastic pallet, the inner core of which is defined by an expandable foam material that is captured within the interior of the pallet so that a density of the foam is materially increased to form a light-weight, rigid construction.

Still another object is to teach a method of constructing a load pallet, wherein resinous materials are utilized for the construction of the essential elements of the pallet and a resinous foam material is employed as the core of the pallet.

Other objects, features and advantages of the invention will become apparent as the description thereof proceeds when considered in connection with the accompanying illustrative drawings.

In the drawings which illustrate the best mode presently contemplated for carrying out the present invention:

Figure 1:
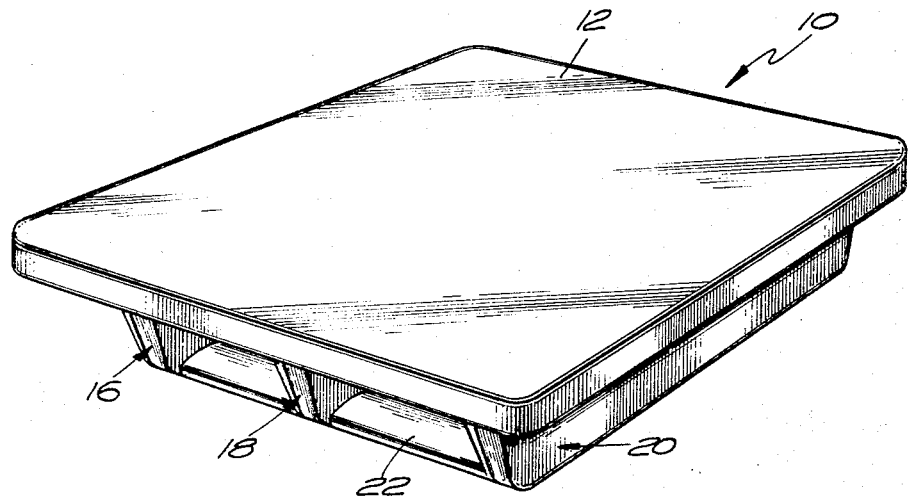
FIG. 1 is a perspective view of the plastic pallet embodied in the present invention.
Figure 2:
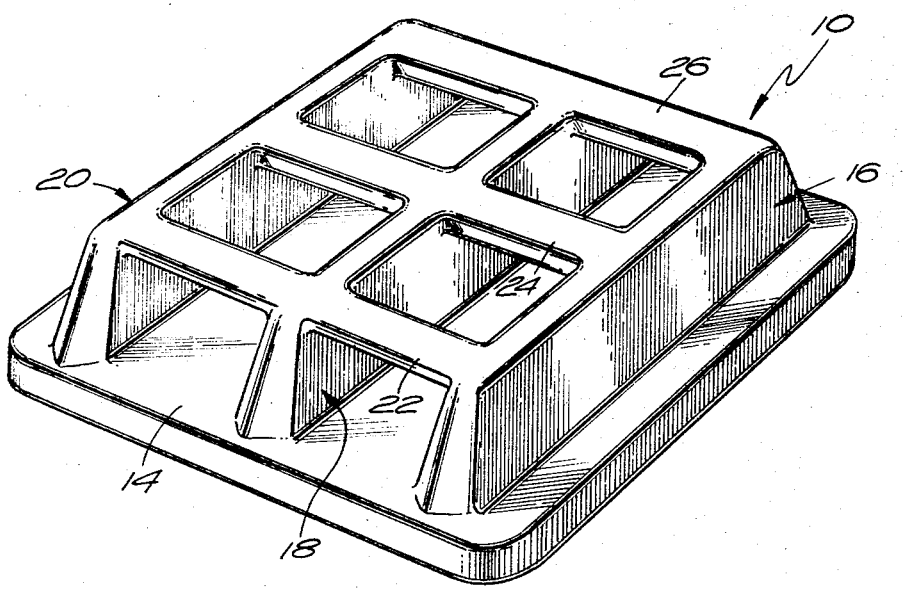
FIG. 2 is a perspective view of the plastic pallet embodied herein showing the bottom construction thereof.

Referring now to the drawings and particularly to FIGS. 1 and 2, the finished pallet construction as embodied in the present invention is illustrated and is generally indicated at 10. As will be described hereinafter, the pallet 10 is fabricated by casting or molding a plurality of individual elements and then joining these elements in a particular manner to form the complete pallet. The pallet 10 in the assembled form thereof has a generally conventional appearance and includes a top member or platform 12 that is joined to a bottom shell 14 that has integrally joined thereto spaced, parallel stringers 16, 18 and 20. The spacing between the stringers 16, 18 and 20 is such as to provide for the entry of the forks of a fork lift truck therebetween. Extending in a direction that is perpendicular to the longitudinal axes of the stringers 16, 18 and 20 are supporting members or spreaders 22, 24 and 26. Although it is not apparent from the illustration of the pallet in FIG. 2, the spreaders 22, 24 and 26 are placed in appropriately formed notches in the stringers 16, 18 and 20, whereby the upper surfaces of the spreaders are coextensive with the adjacent surfaces of the stringers. The location of the spreaders 22, 24 and 26 with respect to the stringers 16, 18 and 20 provides for rigid reinforcement of the pallet assembly and further defines surfaces for stacking the pallets one upon the other, or for placing a pallet on a flat surface. As will be further described, the spreader 22 is formed such that the leading edge thereof is tapered, as illustrated in FIG. 1, thereby providing for leading of the forks of a fork lift truck into the spaces defined by the stringers 16, 18 and 20. The forward edges of the stringers 16, 18 and 20 are also tapered to further aid in leading in the forks of a fork lift truck into the spaces between the stringers. The completed pallet 10 has the appearance of being formed of a unitary element. However, as will be described, each of the elements of the pallet may be individually cast or molded and are then joined in a particular manner to form the finished pallet.

Figure 3:
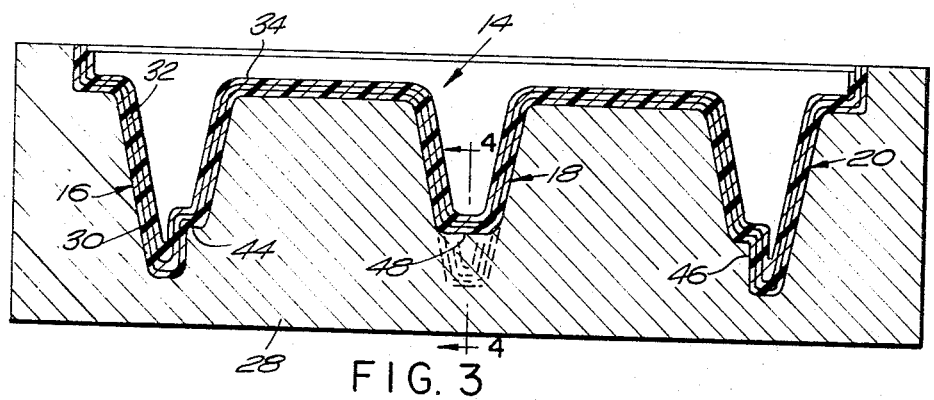
FIG. 3 is a vertical sectional view of the mold for forming the bottom shell of the pallet, and further illustrating the manner in which the bottom shell is formed in the mold.
Figure 5:
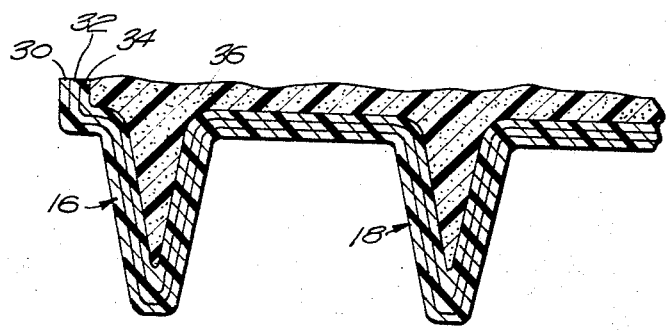
FIG. 5 is a fragmentary sectional view of the shell after it has been removed from the mold and after the pouring of the foam material into the interior thereof.
Figure 4:
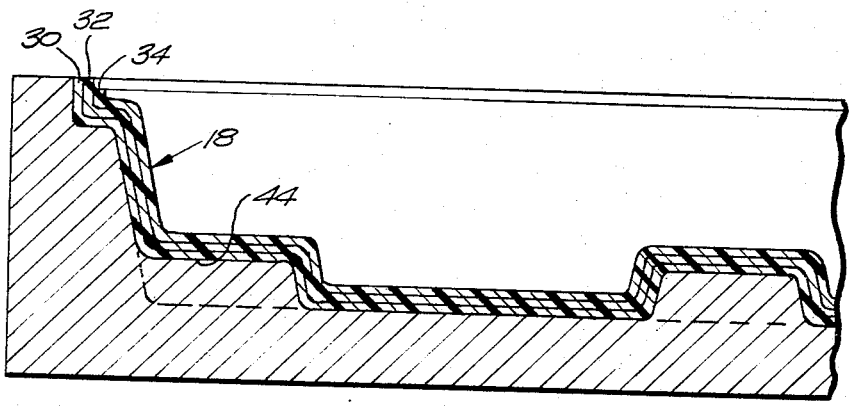
FIG. 4 is a sectional view taken along line 4—4 in FIG. 3.
Figure 6:
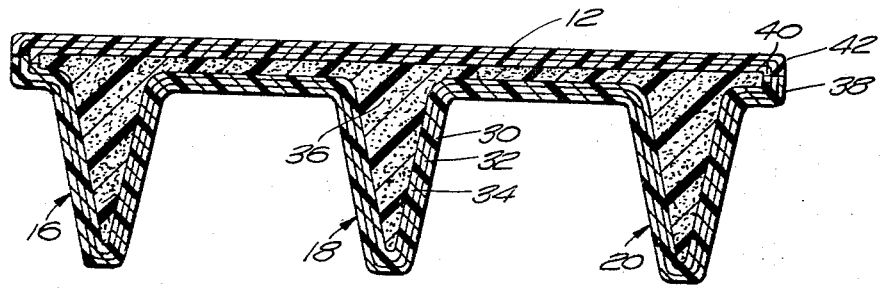
FIG. 6 is a sectional view of the assembled top member and bottom shell and prior to the securement of the supporting spreaders thereto.

Referring now to FIGS. 3 through 8, the method embodied in the fabrication of the pallet 10 is illustrated and will now be described. The individual elements of the pallet 10 are normally separately cast, and, as illustrated in FIG. 3, the bottom shell 14 is formed by first applying a resinous material into a mold 28. The resinous material is applied in layers in the mold in a prescribed sequence to form the bottom shell 14 with a skin, the thickness of which is determined by the number of layers of the resinous material that is sprayed into the mold 28. Prior to the spraying of resinous material into the mold 28, a separating material may first be applied within the mold cavities, the separating material provides for easy withdrawal of the cast bottom shell after the setting thereof. In carrying out the formation of the bottom shell 14, a first layer of liquid plastic material indicated at 30 is sprayed into the cavities of the mold 28, the thickness of the layer 30 being determined by the amount of the material that is sprayed into the mold. Although various kinds of plastic materials are contemplated for use in the construction of the pallet of the present invention, a resinous material is preferred, examples of which are an epoxy resin and a polyester resin, and these materials as used are generally clear in appearance. After the first layer of the plastic material 30 is applied to the interior of the mold 28, a second layer of liquid plastic material is then applied onto the surface of the layer 30. The second layer of plastic material is also preferably a resin such as an epoxy or polyester and is preferably reinforced with a filler, one example of which is fiberglass, so as to increase the flexural strength of the bottom shell when the casting thereof is complete. A third layer of plastic material, such as a clear epoxy or polyester resin, indicated at 34 may then be applied to the surface of the second layer 32, the layers 30, 32 and 34 combining to form a skin of predetermined thickness. It is understood that additional layers of the reinforced resinous material 32 and the clear resinous material may be applied to the cavities of the mold 28 to increase the thickness of the skin of the bottom shell as required. As seen in FIG. 3, the mold cavities are informed in a particular manner and are pre-formed in order to obtain the particular configuration of the bottom shell that is required in the construction of the pallet. After the thickness of the bottom shell is built up by spraying the various layers of resinous material into the mold 28, and after the layers have set, the bottom shell is removed from the mold for the next step in the fabrication of the pallet.

With the bottom shell 14 removed from its mold 28, the interior of the bottom shell is then charged with a cellular resinous foam material, such as urethane foam, that has inherent expanding characteristics upon the pouring thereof. The cellular plastic foam is thus poured into the interior of the bottom shell as indicated at 36 in FIG. 5. Since the density of the resinous foam 36 will normally be increased if the expanding of the foam is restricted after the pouring thereof, the rigidity of the pallet may be increased by capturing the foam within the shell. Thus, immediately following the pouring of the foam material 36 into the bottom shell 14, the top member 12 is clamped in position on the bottom shell 14 to capture the foam material within the shell 14. In order to properly locate the top member 12 with respect to the bottom shell 14, the peripheral edge 38 of the bottom shell is notched as indicated at 40 and receives a complementary notched construction that is formed on the peripheral or marginal edges 42 of the top member 12. It will be understood that the top member 12 may be cast in a manner as previously described in connection with the bottom shell 14, that is to say, the top member 12 may be cast in a mold by applying a plurality of layers of resinous material into the mold until the top member is built up to the required thickness as illustrated. The materials from which the top member 12 is formed are also preferably a clear epoxy resin and a fiberglass reinforced epoxy resin, although other plastic materials may be utilized as desired.

Since the expandable resinous foam material 36 has inherent adhering characteristics, the expansion thereof into contact with the under surface of the top member 12 will cause the top member 12 to immediately and permanently adhere to the foam material. Further, the top member is secured to the bottom shell along the peripheral edges thereof by applying a plastic film, such as an epoxy or polyester film, along these peripheral edges. With the top member secured in place by the adherence thereof to the expanding cellular foam material 36, the rigid skin of the top member 12 and the bottom shell 14 cooperate with the captured foam material to produce an unusually rigid construction. As previously described, the density of the foam material that is captured within the bottom shell 14 by the top member 12 is substantially increased, and in accordance with the present invention the density of the foam material may be increased to at least 100 percent over the density thereof when applied to the shell. Although the density of the foam material is increased because of the capturing thereof by the top member 12, the foam material still retains the lightweight characteristics thereof and thus cooperates with the bottom shell 14 and the top member 12 to produce a lightweight but rigid construction. Although not illustrated in the drawings, small air vent holes are formed in the top member 12 to provide for the escape of air from the bottom shell 12 during the expansion of the foam material 36 and after the top member 12 is clamped to the bottom shell 14.

Figure 7:
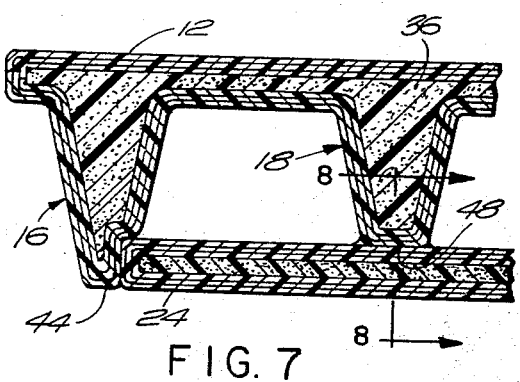
FIG. 7 is a fragmentary sectional view showing the securement of a supporting spreader to the bottom shell.
Figure 8:
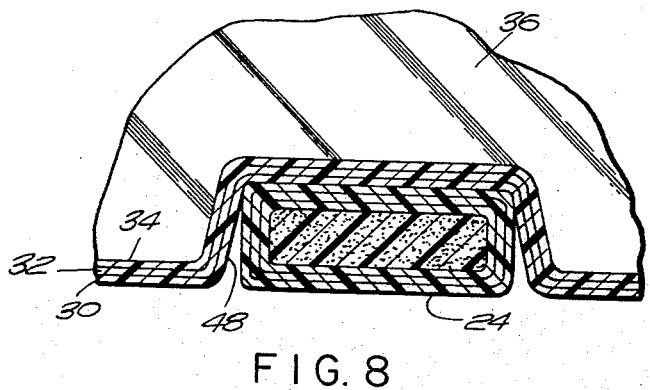
FIG. 8 is a fragmentary sectional view taken along lines 8—8 in FIG. 7.

Referring again to FIGS. 3 and 4, the mold 28 in which the bottom shell 14 is formed is constructed in such a manner as to provide for the formation of the stringers 16, 18 and 20 as the layers of resinous material are sprayed therein. Since it is necessary to provide for the joining of the spreaders 22, 24 and 26 with the stringers, the mold 28 is pre-formed to accommodate the spreaders on the stringers. As shown in particular in FIG. 3, the stringers 16 and 20 are notched at spaced intervals as indicated at 44 and 46. It will be seen that the notches 44 and 46 do not extend to the outer edges of the stringers 16 and 20, and thus the spreaders 22, 24 and 26 will be received within the notches 44 and 46 and will appear to be formed as an integral part of the stringers. Contrary to the formation of the notches 44 and 46, spaced notches 48 are formed in the stringer 18 but extend therethrough as illustrated in FIGS. 3, 7 and 8.

The spreaders or supporting members 22, 24 and 26 are constructed in a manner similar to the construction of the other elements of the pallet as previously described hereinabove. Thus, the spreaders 22, 24 and 26 are cast in a mold by applying a plurality of layers of a plastic material, such as an epoxy or polyester resin, therein, the layers of resin being comprised of a clear epoxy or polyester resin and an alternate layer of epoxy or polyester resin impregnated with fiberglass. As shown in FIGS. 7 and 8, the spreaders 22, 24 and 26 are also formed with a cellular foam core that is poured into the shell of the spreaders and captured therein by applying a top layer of material on the hollow spreader to capture the foam therein. It is understood that the spreaders may be formed in elongated sections and then cut to the required lengths. The completed spreaders are then placed in position by the location thereof in the notches 44, 46 and 48 that have been precast into the stringers 16, 18 and 20, as previously described. It is further understood that a plastic film, such as an epoxy or polyester film, for use as an adhesive may be applied to the spreaders and stringers for the securement of the spreaders 22, 24 and 26 in the notches that are formed in the stringers 16, 18 and 20 as illustrated. As described, the spreaders 22, 24 and 26 are incorporated in the pallet construction to add rigidity thereto, and in many instances the use of the spreaders would be required. However, it is also contemplated in certain instances to delete the spreaders from the unit, in which case the notches formed in the stringers 16, 18 and 20 would not be required.

As described above, the spreaders 22, 24 and 26 are formed of a plastic material. In order to reduce the cost of the unit, the spreaders may be formed of other materials, such as wood or composition, and inserted in place as previously described. In this connection, the non-plastic spreaders could be sprayed with a plastic coating such as a resinous film to impart an all-plastic appearance to the unit.

With the pallet in the assembled position, a film of clear resinous material, examples of which are an epoxy or polyester resin, may then be sprayed over the entire outer surfaces of the elements, including the top member 12, bottom shell 14, the stringers 16, 18 and 20 and the spreaders 22, 24 and 26. The film of resinous material acts to seal the outer surfaces of the pallet and fills any imperfection or cracks that may have appeared therein. Thus, it is seen that the entire pallet is positively sealed to become a solid construction. If desired, the sealing film of resin that is sprayed onto the outer surfaces of the pallet may be provided with a pigment of any suitable color so as to impart an ornamental appearance to the pallet. Since the pigment will be formed as part of the resinous film, it will also be a permanent part of the pallet construction and will not crack or chip when the pallet is used. This is true even though the pallet may be subjected to high impact loads, scraping or chipping. Although the sealing coat as just described does act to effectively seal the unit and eliminates surface imperfections, this sealing coat may be avoided if the plastic layers of the molded components cooperate to produce an acceptable outer surface. Further, when the spreaders 22, 24 and 26 are eliminated, the sealing coat may not be a requirement for the finished pallet.

The pallet 10 as constructed has all the appearances of the heretofore known wood pallet construction, but, because of the constructional features thereof, and particularly the use of the foam material, the pallet 10 of the present invention is approximately 80 percent lighter than the previously known wood pallets. Furthermore, the pallet of the present invention is resistant to high impact and severe shock and is further impervious to moisture. Because of the use of the plastic materials, the pallet 10 may be used in a variety of atmospheres and will withstand temperatures ranging from −40° to 275° F. Thus, the pallet of the present invention may not only be used and stored in cold areas, but may be further employed and withdrawn from low temperature storage areas and immediately used in high temperature atmospheres. Because of the foam core, the pallet 10 is lightweight and may be easily handled for storing as required. The one-piece flat top or platform provides a relatively large stacking area and further produces better balancing for higher stacking of articles thereon. The bottom of the pallet, on the other hand, as defined by the stringers 16, 18, 20 and the spreaders 22, 24, 26, forms a uniform surface that provides for even distribution of weight for the pallet and enables relatively large loads to be stacked on the platform 12.

It is seen that if the pallet is to be employed with articles where sanitary conditions are required, such as with cerain food articles, cleaning and even autoclaving of the pallet is easily accomplished due to the use of the resinous materials.

It is further seen that since the pallet is formed of the plastic materials as described, damage to goods carried therein will be negligible. This is so since there are no sharp edges, nails or foreign parts associated with the pallet. All of the corners formed thereon are rounded, and the plastic shell has a certain resilience that cushions the load carried on the pallet. Finally, the use of resinous materials renders the pallet completely nontoxic, which is of considerable importance when food-stuffs and other similar types of articles are to be carried thereon.

While there is shown and described herein certain specific structure embodying the invention, it will be manifest to those skilled in the art that various modifications and rearrangements of the parts may be made without departing from the spirit and scope of the underlying inventive concept, and that the same is not limited to the particular forms herein shown and described, except insofar as indicated by the scope of the appended claims.

I claim:

1. In a load carrying pallet, an open-top bottom shell defined by a plurality of laminated layers of resinous material, at least one of said layers having a reinforcing filler impregnated therein, said open-top bottom shell including a plurality of spaced parallel hollow members that define the spaces for receiving the forks of a lift truck, a top member formed of layers of resinous material and being joined to the uppermost end of said open-top bottom shell to define an integral top construction therewith, the interior of said bottom shell being filled with an expandable foam material that is adhered to the under surface of said top member to join said top member to said bottom shell, a plurality of supporting members being secured to said hollow members on the exterior surface thereof and spaced from the underside of said top construction, said parallel members being formed with notches therein for receiving said supporting members, the depth of said notches being dimensioned for locating the outer surfaces of said supporting members in coextensive relation with respect to the adjacent outer surfaces of said parallel members, and a film of resinous material covering the exterior surfaces of said bottom shell, top member and supporting members to form a sealing surface therefor.

2. In a load carrying pallet, an open-top bottom shell defined by a plurality of laminated layers of resinous material, at least one of said layers having a reinforcing filler impregnated therein, said open-top bottom shell including a plurality of spaced parallel hollow members that define the spaces for receiving the forks of a lift truck, a top member formed of layers of resinous material and being joined to the uppermost end of said open-top bottom shell to define an integral top construction therewith, the interior of said bottom shell being filled with an expandable foam material that is adhered to the under surface of said top member to join said top member to said bottom shell, said bottom shell having a peripheral edge extending therearound, and said top member being formed with a peripheral edge that conforms to the peripheral edge of said bottom shell and is adhered thereto, at least one supporting member being secured to said hollow members on the exterior surface thereof and spaced from the underside of said top construction, and a film of resinous material covering the exterior surfaces of said bottom shell, top member and supporting member to form a sealing surface therefor.

3. In a load carrying pallet, an open-top bottom shell defined by a plurality of laminated layers of resinous material, at least one of said layers having a reinforcing filler impregnated therein, said open-top bottom shell including a plurality of spaced parallel hollow members that define the spaces for receiving the forks of a lift truck, a top member formed of layers of resinous material and being joined to the uppermost end of said open-top bottom shell to define an integral top construction therewith, the interior of said bottom shell being filled with an expandable foam material that is adhered to the under surface of said top member to join said top member to said bottom shell, a plurality of supporting members being secured to said hollow members on the exterior surface thereof and spaced from the underside of said top construction, said supporting members being located in perpendicular relation with respect to said parallel members, and one of said supporting members being positioned adjacent to an end of said parallel members, the leading edge of the adjacent supporting member being reduced and tapered in cross section to accommodate and lead in the forks of the lift truck between parallel members, and a film of resinous material covering the exterior surfaces of said bottom shell, top member and supporting members to form a sealing surface therefor.

4. In a load carrying pallet, an open-top bottom shell defined by a plurality of laminated layers of resinous material, at least one of said layers having a reinforcing filler impregnated therein, said open-top bottom shell including a plurality of parallel hollow members that define the spaces for receiving the forks of a lift truck, a top member formed of layers of resinous material and being joined to the uppermost end of said open-top bottom shell to define an integral top construction therewith, the interior of said bottom shell being filled with an expandable foam material that is adhered to the under surface of said top member to join said top member to said bottom shell, at least one supporting member being secured to said hollow members on the exterior surface thereof and spaced from the underside of said top construction, and a film of resinous material covering the exterior surfaces of said bottom shell, top member and supporting member to form a sealing surface therefor, said expandable foam material being insertable within said bottom shell prior to the joining of said top member thereto, said foam expanding within said shell but being captured therein by said top member, wherein the density of the captured foam is materially increased over the density thereof when applied to said shell.

5. In a load carrying pallet, an open-top bottom shell formed of a plastic material and including a plurality of spaced parallel hollow members that define the spaces for receiving the forks of a lift truck, an independently formed top member joined to the uppermost end of said open-top bottom shell to define an integral top construction therewith, the interior of said bottom shell being filled with an expandable foam plastic material that is adhered to the under surface of said top member to join said top member to said bottom shell, said expandable foam plastic material being insertable within said bottom shell prior to the joining of said top member thereto and expanding within said shell but being captured therein by said top member, wherein the density of the captured foam plastic material is materially increased over the density thereof when applied to said shell.

6. In a load carrying pallet as set forth in claim 5, said bottom shell being defined by a plurality of laminated layers of plastic material.

7. In a load carrying pallet as set forth in claim 6, said plastic material being a resin.

8. In a load carrying pallet as set forth in claim 6, at least one of said layers having a reinforcing filler impregnated therein.

9. In a load carrying pallet as set forth in claim 8, the reinforcing filler impregnated in one of said layers of plastic material being fiberglass.

10. In a load carrying pallet as set forth in claim 5, at least one supporting member being secured to said hollow members on the exterior surface thereof and spaced from the underside of said top construction.

11. In a load carrying pallet as set forth in claim 5, a film of resinous material covering the exterior surfaces of said bottom shell and top member and forming a sealing surface therefor.

References Cited

UNITED STATES PATENTS

| | | | |
|---|---|---|---|
| 3,079,877 | 5/1963 | Doane | 108—56 |
| 3,120,825 | 2/1964 | Johnson | 108—51 |
| 3,140,672 | 7/1964 | De Luca | 108—53 |
| 3,141,422 | 7/1964 | Woolworth | 108—56 |
| 3,187,689 | 6/1965 | Hess | 108—58 |
| 3,187,691 | 6/1965 | Leitzel | 108—58 |
| 3,199,469 | 8/1965 | Sullivan | 108—53 |

DAVID J. WILLIAMOWSKY, *Primary Examiner.*

G. O. FINCH, *Assistant Examiner.*